United States Patent [19]

McGuire

[11] Patent Number: 5,127,607
[45] Date of Patent: Jul. 7, 1992

[54] FLUID TORQUE-RESTRAINT SYSTEM WITH OPTIMIZED FLUID EXPANSION

[75] Inventor: Dennis P. McGuire, Erie, Pa.

[73] Assignee: Lord Corporation, Erie, Pa.

[21] Appl. No.: 727,185

[22] Filed: Jul. 9, 1991

[51] Int. Cl.$^5$ .......................................... B64D 27/00
[52] U.S. Cl. ..................................... 244/54; 248/550; 248/631
[58] Field of Search .................. 244/54; 248/556, 557, 248/554, 550, 575, 63; 180/292, 304, 902; 60/39.31

[56] References Cited

U.S. PATENT DOCUMENTS

| | | | |
|---|---|---|---|
| 2,705,118 | 3/1955 | Beck | 267/3 |
| 4,236,607 | 12/1980 | Halwes et al. | 188/379 |
| 4,811,919 | 3/1989 | Jones | 244/54 |

Primary Examiner—Joseph F. Peters, Jr.
Assistant Examiner—Anne E. Bidwell
Attorney, Agent, or Firm—R. K. Thomson

[57] ABSTRACT

A torque-restraint mounting system for connecting an aircraft engine to a structure including at least two hydraulic mountings and at least one other resilient mounting. At least two of the hydraulic mountings are fluidicly interconnected via a fluid filled conduit. This allows for the torque to be reacted between the aircraft engine and the structure by placing the fluid in compression. The relative torque-induced displacement occurring between the aircraft engine and the structure for any specific operating copndition is counteracted by tuning the amount or volume of fluid within the torque-restraint system, or by tuning the coefficient of thermal expansion of the fluid. Thus, as the torque-restraint mounting system heats up, the aircraft engine will change rotational position such that its room temperature untorqued orientation can be maintained. This can have significant benefits in terms of increasing service life of the engine mounting system.

6 Claims, 4 Drawing Sheets

FLUID TORQUE-RESTRAINT SYSTEM WITH OPTIMIZED FLUID EXPANSION

FIELD OF THE INVENTION

The present invention relates to the general class of resilient supports, and more specifically to the area of a system of three or more supports for attaching an aircraft engine to a structure. In particular, the system comprises at least two resilient supports which are fluidicly interconnected and at least one other resilient support.

BACKGROUND OF THE INVENTION

One configuration of a resilient torque-restraint mounting system is described in the commonly assigned U.S. Pat. No. 2,705,118 issued to M. G. Beck on Mar. 29, 1955. This configuration is shown as the "prior art" embodiment of FIG. 1. A pair of resilient hydraulic mounting units are located at substantially opposite sides of the torque axis of a first body. The hydraulic mountings, consist of an outer housing and an inner member and a movable elastomeric wall portion, moveable in response to vibrations thereto, and a fluid chamber within each hydraulic mounting. The working fluid is contained within the working chambers of the hydraulic mountings and within a conduit for connecting the two hydraulic mounting together. This system creates a resilient connection between a first body for retraining movements, and in particular for retraining torque relative to the second body. Depending on the orientation of the hydraulic mountings, this arrangement can provide a system which has both a low degree of freedom, i.e., stiff in the torsional direction and a high degree of freedom, i.e., soft in relative translation between the two bodies. Thus a system is provided which can react torque loads and yet remain soft enough in the vertical and lateral translation directions to provide adequate isolation.

The aforementioned fluid within the conduit can provide the means for a variety of tuning policies as is well known to those skilled in the art. U.S. Pat. No. 4,236,607 issued to Dennis R. Hawles and William A. Simmons on Dec. 2, 1980, describes the use of a liquid tuning mass, specifically liquid mercury, which provides the opportunity to generate amplified inertial forces to cancel vibration. Also taught is changing of the mass in the tuning passage by either changing the length, or cross sectional area of the fluid passage. The commonly assigned U.S. Pat. No. 4,811,919 issued to P. J. Jones on Mar. 14, 1989, is herein incorporated by reference and further teaches this tuning option. These tuning parameter changes will ultimately alter the fluid inertia value, or effective fluid mass contained in the fluid system. Thus, the system can be tuned to provide inproved isolation for any specified operating condition. In addition, as taught in Beck '118 patent, adding a restriction in the conduit can increase the damping level for controlling transitory conditions or for controlling torsional dynamic vibrations. This is accomplished by throttling the working fluid through the aforementioned restriction, as is well known to those skilled in the art.

The engine mounting system 9 shown in FIG. 2 is considered to be the current "prior art" torsionally stiff configuration, and includes a mechanical torque-restraint system 10. The FIG. 2 system consists of a torque tube 11 connected to the engine 13 and a structure 15 to which the various resilient mountings 17 and other attachments are connected. Torque from the engine 13 is reacted by torsionally winding up of the torque tube 11. The loads due to torque are transferred into the structure 15 through offset links 19 which are attached to levers 16 at each end of the torque tube 11. Since the links 19 are attached at a point spaced from the centerline of the torque tube 11, a moment is created for reacting the engine torque. Also, since the components in the mechanical torque-restraint system 10 are flexible, some torsional rotation of the engine 13 relative to the structure 15 will occur when torque is applied. This torsional windup results in deflections across the other resilient mountings 17 in the "prior art system".

Of further note is that most aircraft mounting systems are safetied or snubbed. These snubbers allow for a hard, metal to metal contact or stopping action for reacting conditions such as, large applied torques and large vertical or lateral loads. It is further notable that the stops are also used for supporting the engine once the resilient mountings 17 have reached their useful service life, i.e., they have drifted to the stops. All resilient mounts, especially elastomeric mounts, are subject to drift phenomena. Drift is a result of having a significant load, such as aircraft engine 13 weight, applied for long periods of time. Typically, the useful lifetime of the aircraft mount is determined by the time it takes to drift to the stops. Once the mounting has drifted to the stops, the mounting system no longer isolates effectively, i.e., the engine vibration is hardlined into the structure, and the mount needs to be replaced. The situation is further aggravated when a higher torque is applied simultaneously along with other vertical loading, such as upon take-off. The torque applied to the system will cause a torsional rotation of the engine, resulting in a translational deflection imparted to each resilient mounting 17. This deflection due to torque is superimposed on the mountings in the system along with those deflections resulting from normal loading, weight, etc. If the mounting condition is poor, this imparted rotational deflection may result in snubbing or metal to metal contact of at least one of the resilient mountings 17, whereas, the mounting may not be snubbed under just weight loading. Again as earlier noted, this snubbing causes excessive vibrations to be transmitted to the structure. Thus it can be seen, that any torsional rotation that occurs can effectively result in the need for prematurely changing out or replacing the resilient mountings 17. If the torsional deflection can be effectively minimized, a longer service life for the mounting can be obtained.

The "prior art" mechanical torque-restraint and "prior art" fluid torque-restraint systems described above offer significant benefits by having a relatively high torsional stiffness and yet still remaining soft enough in the translational directions, to provide adequate isolation. Also, as is known to those skilled in the art, the fluid torque-restraint system can be tuned to provide a variety of tuning policies such as tuning the fluid inertia to provide improved isolation, or tuning an orifice to provide increased damping. Yet, these prior art systems, when subjected to large applied torques, will still permit undesirable torsional motions of the engine to occur. Thus, it should be understood that, the current known mounting systems will, under large torques, be unable to restrain the undersirable relative torsional movements between the two bodies to which the torque-restraint system is attached. This will result in premature bottoming out or snubbing of the mounting system resulting in an increase in vibration transmitted under some conditions.

SUMMARY OF THE INVENTION

Therefore, in accordance with one aspect of the present invention, it is the intent to provide an improved fluid torque-restraint system whereby the total amount or volume of fluid contained within the system is tuned such that the relative rotational deflections between the aircraft engine and the structure are minimized or counteracted for a particular operating condition. In accordance with another aspect of the invention, an improved fluid torque-restraint system is provided whereby the service life of the system is usefully extended. In accordance with another aspect of the invention, the means are provided for varying or tuning the rotational relative deflection in response to a temperature change of the system. Means include tuning of the volume of fluid in the system and tuning of the coefficient of thermal expansion of the fluid. Several preferred embodiments of the present invention are shown which can replace and improve upon both the "prior art" mechanical torque-restraint system in FIG. 2 and the "prior art" fluid torque-restraint system shown in FIG. 1. Therefore, it should be understood that the present invention is able to counteract the rotational deflections resulting from engine torque and usefully extend the service life, a problem unable to be solved by the previous systems.

BRIEF DESCRIPTION OF THE DRAWINGS

The accompanying drawings which are incorporated in, and form a part of this specification illustrate several key embodiments of the present invention. The drawings and description together, serve to fully explain the invention. In the drawings.

DESCRIPTION OF THE PREFERRED EMBODIMENTS

Figure 1:
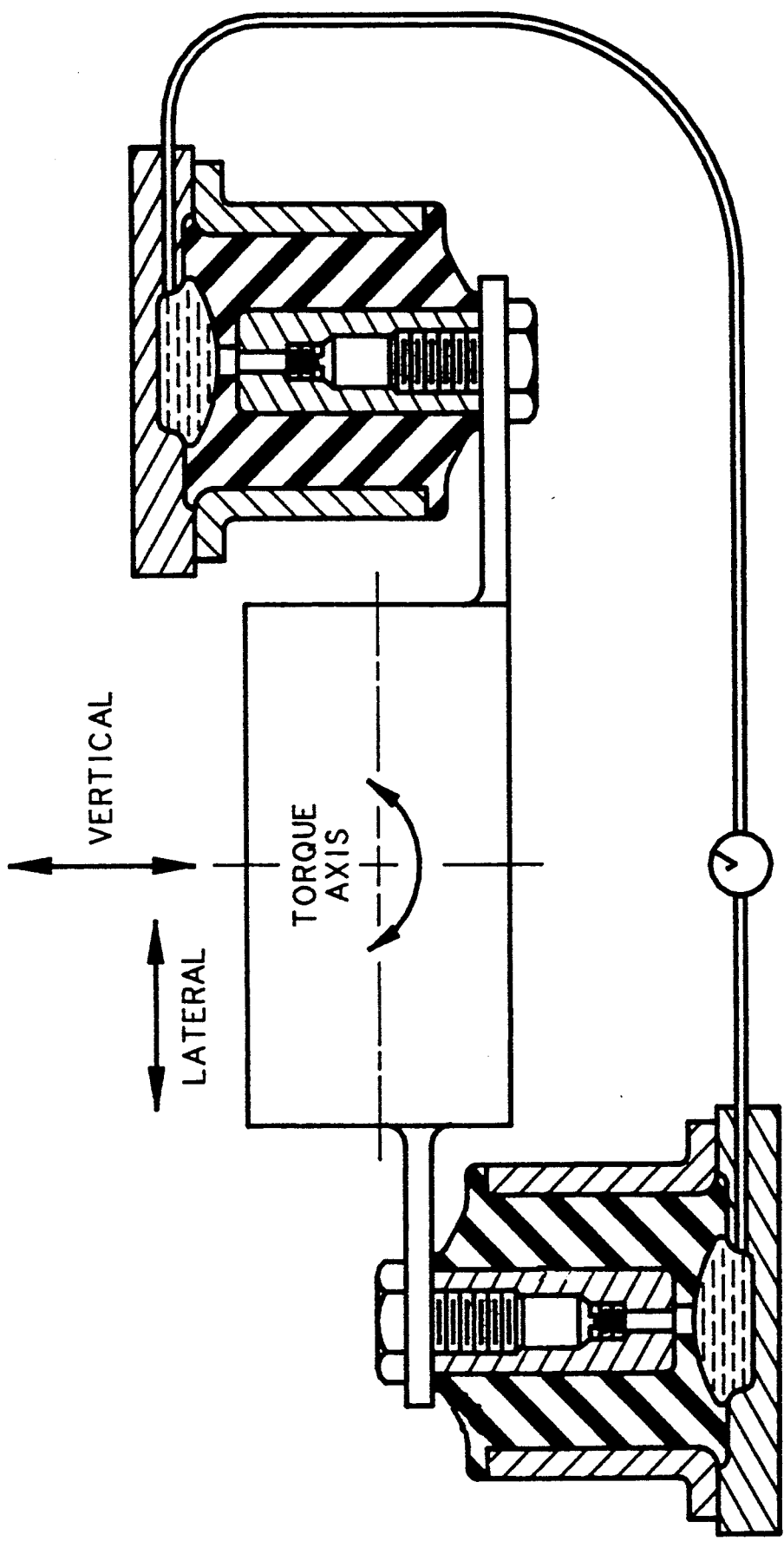
FIG. 1 is a schematic side view in partial section of a "prior art" embodiment of a fluid torque-restraint system wherein, the working fluid chambers of both hydraulic mountings are connected. Also shown is an adjustable valve means between the two bodies.
Figure 2:
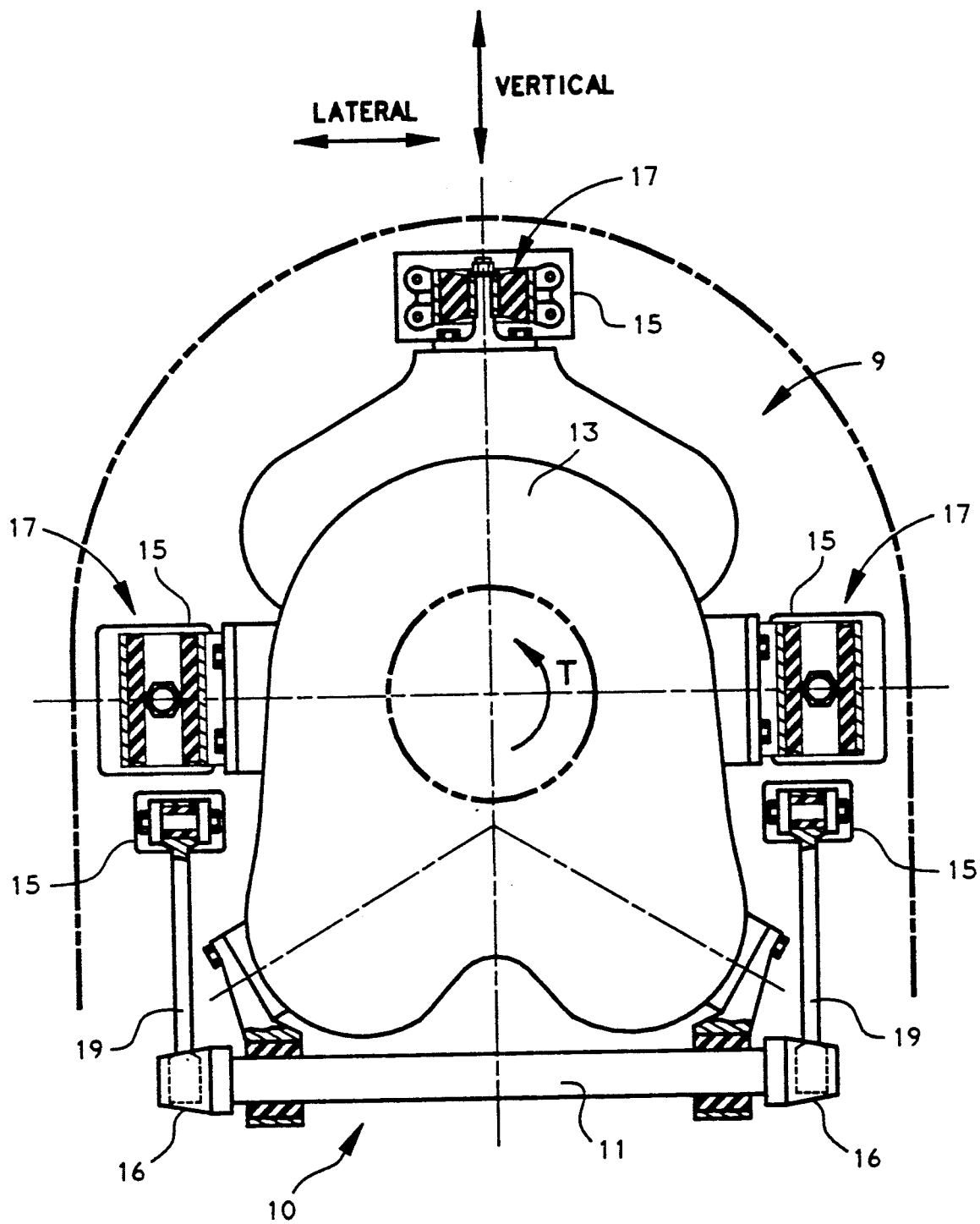
FIG. 2 is a schematic front elevational view in partial section of a "prior art" embodiment of a mechanical torque-restraint system.
Figure 3:
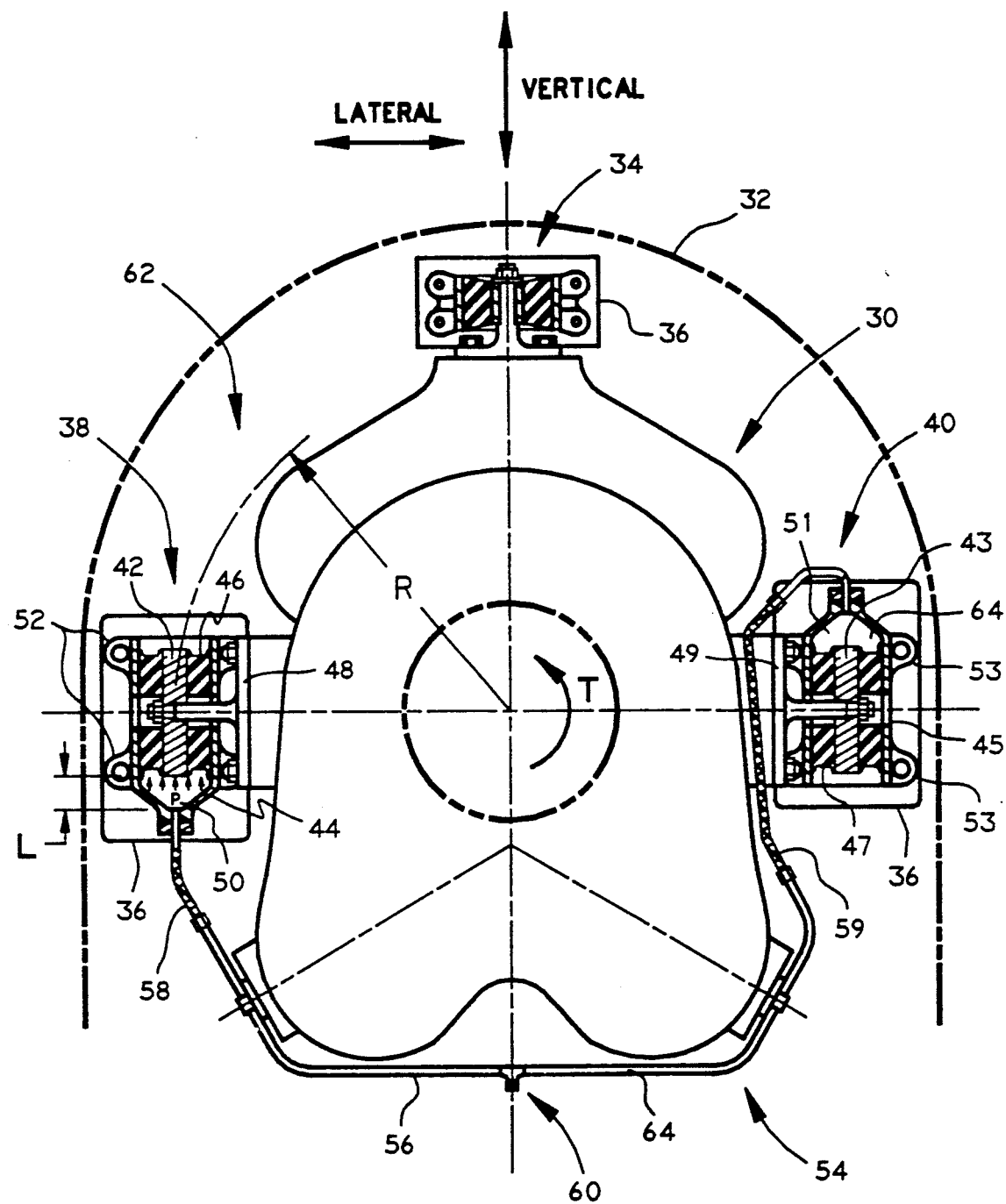
FIG. 3 is a schematic front elevational view in partial section of the first preferred embodiment of the improved fluid torque-restraint system wherein, the working fluid chambers of the hydraulic mountings are interconnected showing a first preferred orientation; and, FIG. 4 is a schematic front elevational view of a second preferred embodiment of the present invention in partial section wherein, the working fluid chambers of the hydraulic mountings are interconnected and showing a second preferred orientation.

A first preferred embodiment of the fluid torque-restraint system of the present invention is shown in FIG. 3. The allowable space envelope for housing the aircraft engine 30 and attachments is defined by the cowling outline 32 indicated as a phantom line. The engine further has at least one resilient mounting 34 attached between the engine 30 and the aircraft structure 36 and at least two hydraulic mountings 38, 40. More than two mountings are required for supporting the engine and reacting the torques and loads encountered. The hydraulic mountings 38, 40 attach to the engine 30 at two points where they are positioned to react torque T. Preferably, the mountings should be spaced apart on either side of the engine 30. However, they can be on the same side provided they are approximately spaced. Each hydraulic mounting 38, 40 is made up of an inner member 42, 43, an outer member 44, 45 and a rubber section 46, 47. The rubber section 46, 47, preferably acts in shear, under vertical loads and can be made of any suitable elastomeric material such as natural rubber. This material should be bonded to the inner member 42, 43 and outer member 44, 45 by any known method. The inner member 42, 43 is connected to the engine 30 by a bracket 48, 49. All the metal parts such as the bracket 48, 49, inner member 42, 43, and outer member 44, 45 are preferably made from 15-5 PH stainless steel or equivalent. Each hydraulic mounting 38, 40 contains a fluid chamber 50, 51, for interacting with the rubber section 46, 47. The hydraulic mountings 38, 40 are connected in such a manner so as to restrain torque T under normal operating conditions. Such an operating condition might be aircraft takeoff or cruise, for example.

Typically, the outer member 44, 45 is connected by bolting it to the structure 36 by such means as flanges 52, 53. Further, the hydraulic mountings 38, 40 are connected together by conduit means 54. The conduit means 54 can be made of a rigid conduit section 56 and flexible conduit sections 58, 59. Alternatively, the whole section could be flexible hose. Ideally, the hose should be of the high-pressure, braided variety. Fill means 60 is shown near the center of the conduit means 54. This fill means 60 is also used for providing a pre-pressure to the fluid torque-restraint system. This is done to eliminate fluid cavitation while dynamic vibrations are imparted to the system under low torque or slightly negative torque conditions. The port 60 is located near the center of the conduit 54 because it is the easiest place to allow fill of the torque-restraint system with the appropriate working fluid 64, and the best location from which to allow the air bubbles to be removed. Many fluids 64 can be used, such as silicone fluids, glycols, or polyglycols. It is desired that the fluids 64 be relatively incompressible. The total volume of working fluid 64 contained in this system is made up of the portions contained in the fluid conduit means 54 and within each of the fluid chambers 50, 51 in each hydraulic mounting 38, 40. As the engine 30 is started and reaches equilibrium temperature, the air 62 inside the cowling 32 heats up, along with any components in contact with or near the engine 30. Eventually, the hydraulic mounts 38, 40, conduit means 54, and the fluid 64 reach some equilibrium temperature.

Once the temperature change $\Delta t$ to the system is known or estimated, along with several other parameters to be discussed later, the fluid volume Vf needed in the torque-restraint system can be calculated, so as to counteract the torque-induced displacement. This volume Vf will counteract any specific torque T which is chosen, such as the torque during aircraft takeoff or aircraft cruise. The parameters that must be known include an approximation of the radius R at which the hydraulic mountings 38, 40 are located relative to the center line of the engine, the coefficient of expansion Ct of the fluid 64, the volume stiffness Kv of the fluid torque-restraint system, and the piston area Ap of each hydraulic mounting 38, 40.

The volume stiffness Kv has units of psi/cubic inch, and can be thought of as the change in volume resulting from a change in applied pressure to the fluid torque-restraint system. Essentially, the fluid torque-restraint system is pressurized when a torque T is applied, the rubber section 46, 47 is then pressurized with an outward pressure P. As a result of the applied torque T, the fluid 64 is compressed, and the compliant rubber section 46, 47 will flex from the application of this pressure P. The piston area (Ap) has units of square inches, and effectively is the cross sectional area of the fluid chamber 50, 51. It is the area that effectively pumps the fluid 64 from one fluid chamber 50, 51 to the other, such as when the system is subjected to dynamic vertical loading. Once the parameters $\Delta t$, R, Kv, Ap, T, and Ct are known, the volume of fluid Vf to essentially counteract the rotational displacement for any applied torque T can be determined by the relationship in Eqn. 1.

$$Vf = \{(T/\Delta t)(1/(2R\ Ap\ Kv\ Ct))\} \quad \text{Eqn. 1}$$

Therefore, knowing or estimating the nominal values for each of the parameters in Eqn. 1, the volume Vf of fluid 64 needed to counteract any specific torque T can be roughly calculated. In the first embodiment, the volume of fluid Vf in the system, is made up of the fluid 64 in the conduit means 56 and fluid chambers 50, 51. The length Lt and diameter Dt of the conduit 56 and piston area Ap have been pre-chosen to give a specific dynamic performance or isolation characteristic, and thus should not be changed. Based on the length Lt, diameter Dt and volume stiffness Kv of the fluid torque-restraint system, piston area Ap and the vertical spring rate Kvert, the specific resulting fluid operating conditions can be determined. These calculations determine the position on the fluid notch frequency (stiffness low) and fluid resonance frequency (stiffness high), and are well known to those skilled in the art of hydraulic mountings and will not be elaborated on here.

Suffice it to say, that once the physical parameters are chosen to ensure adequate dynamic performance, the parameters Ap, Lt, Dt, Kv, Kvert must not change. Instead, the volume within the fluid chambers 50, 51 is that which can be tuned for obtaining the desired volume Vf of fluid in the system for counteracting the torque-induced displacement. This can be accomplished by changing the effective length L of one or both of the fluid chambers 50, 51. Another method for counteracting the torque-induced displacement would be by effectively changing the coefficient of thermal expansion Ct of the fluid 64, i.e., by changing fluids. The fluid 64 could be selected from several fluids exhibiting different coefficients of thermal expansion Ct, such as glycols, polyglycols and silicone fluids. A typical example of determining the volume of fluid Vf needed to counteract the torque-induced engine rotation under a specific operating torque T condition is shown below.

EXAMPLE

Consider a fluid torque-restraint with the nominal parmeters:

| | |
|---|---|
| Kvert = 19,200 lb/in | (total vertical stiffness) |
| T = 50,000 in lbs | (torque applied to the torque restraint at take off) |
| Ap = 7.9 in$^2$ | (piston area of hydraulic mount) |
| Ct = 0.000594 in/in/deg F. | (coefficient of thermal expansion of silicone fluid) |

| -continued | |
|---|---|
| Kv = 350 psi/in$^3$ | (volume stiffness of torque-restraint, in series) |
| $\Delta t$ = 70 deg F. | (temperature change of the working fluid) |
| R = 14.63 in | (radius to hydraulic mount from engine center line) | then using Eqn. 1:

$$Vf = \{(T/\Delta t)(1/(2R\ Ap\ Kv\ Ct))\}$$

Vf = {(50000 in lb/70 degF)(1/(2 (14.63 in)(7.9 in$^2$)(350 psi/in$^3$)(0.000594 in/in/degf))}

Thus, the fluid volume needed Vf to counteract the torque T is:

Vf = 14.9 in$^3$

For a typical fluid torque-restraint system with a fluid notch frequency tuned to 18 hz, the inertia track or conduit would have the approximate dimensions:

Lt = 38 inches

Dt = 0.48 inches

Therefore, the amount of fluid contained in the inertia track is:

V track = 6.9 in$^3$

The remaining fluid portion needed will be supplied at the fluid chambers:

V remain = 8.00 in$^3$ or V chamber = 4.00 in$^3$

Given that the piston area Ap of the hydraulic mounting 38, 40 is known, the length L of each of the chambers 50, 51 can be calculated to substantially counteract the torque-induced displacement.

L = V chamber/Ap = 4.00 in$^3$/7.9 in$^2$ = 0.506 inch

L = 0.506 inch

Thus, it can be seen from the foregoing example, that the fluid torque-restraint system can now counteract the torque-induced displacement, without altering the dynamic tuning of the notch frequency of the system.

Figure 4:
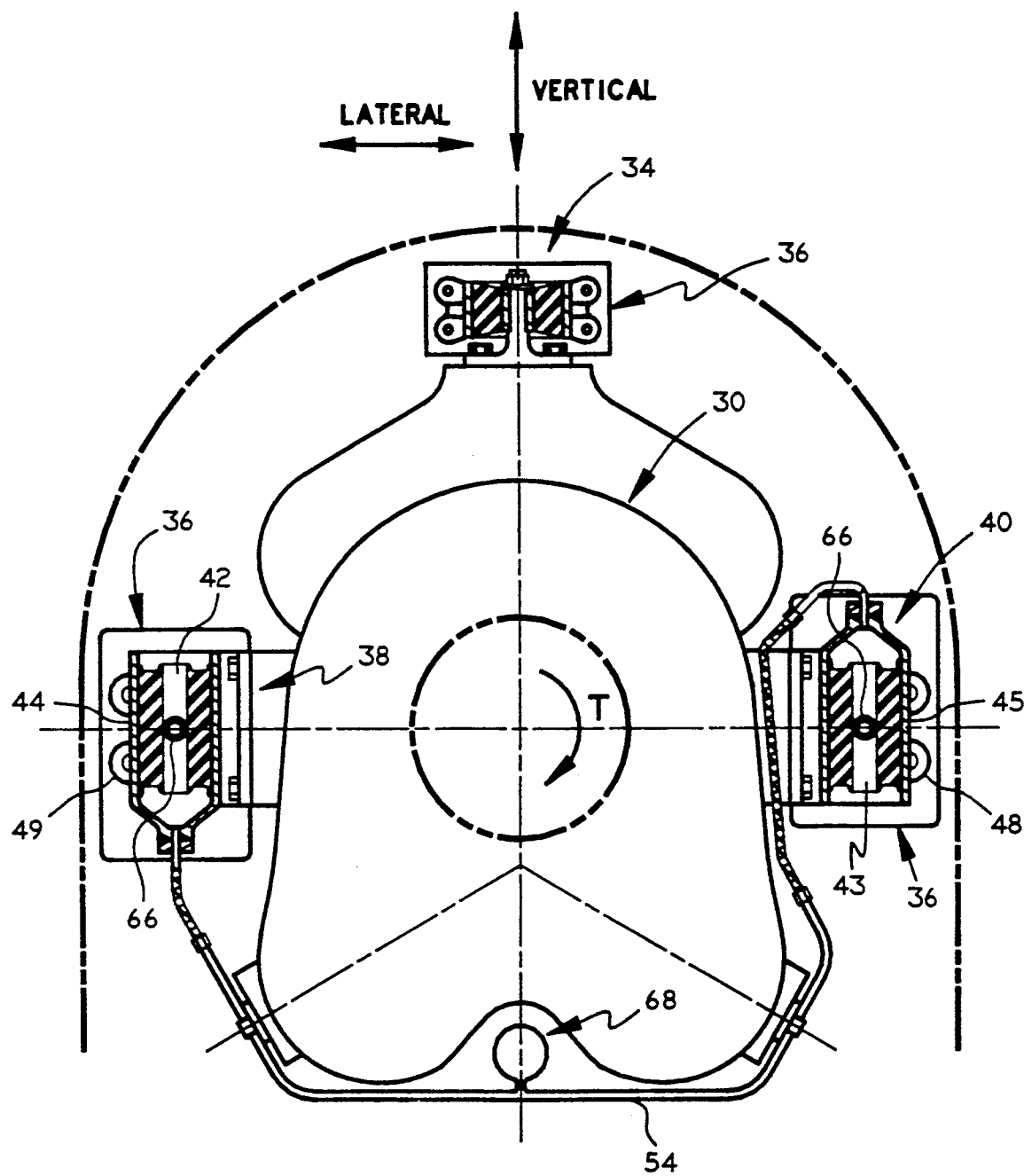

Reference is now made to FIG. 4, which shows a second preferred embodiment of the present invention. Again, the engine 30 is attached to a structure 36. However, in this embodiment, the outer member 44, 45 is attached to the engine 30 and the inner member 42, 43 is attached to the structure 36 by a bracket 48, 49 which attaches via a stud 66 extending through inner member 42, 43. As in the first embodiment, at least one other resilient mounting 34 is required in the system, for fully supporting the engine. In this case, it is shown as a simple tubeform mounting, but it could also be a fluid mounting. The system includes two hydraulic mountings 38, 40 interconnected by conduit means 54. Also shown in this embodiment along with the second orientation, is the addition of a fluid reservoir 68. The fluid reservoir can be placed anywhere in the system. Although shown attached to the fluid conduit 54, it could be attached to the hydraulic mountings 38, 40 as well, if space permits. The function of the fluid reservoir 68 is to provide additional volume of working fluid 64 necessary to tune the rotational displacement of the system as a result of the temperature change $\Delta t$.

Each of the embodiments described above, provide for an increase in useful service life with respect to the known torque-restraint systems. This is a result of a greater percentage of the torque-restraint being borne by the fluid and less by the elastomeric elements of the mount. Further, the improvement includes a fluid torque-restraint system which offers the means for tuning of the volume of fluid contained within the system to compensate for rotational deflections resulting from torque. Various changes, alternatives and modifications will become apparent to those skilled in the art following a reading of the foregoing specification. It is intended that all such changes, alternatives and modifications fall within the appended claims be considered part of the present invention.

I claim:

1. A fluid torque-restraint system for restraining the torque between an aircraft engine and a structure, which is used with at least one other resilient mount, wherein said fluid torque-restraint system comprises:
    a) a first hydraulic mounting;
    b) a substantially similar second hydraulic mounting;
    c) said first hydraulic mounting and said second hydraulic mounting each further including an inner member for connecting to said engine, and an outer member for connecting to said structure and an rubber section resiliently connecting said inner member and said outer member;
    d) said outer member, said inner member and said rubber section cooperating to form a fluid chamber within each said hydraulic mounting;
    e) said fluid chambers within said first hydraulic mounting and said second hydraulic mounting being interconnected by a conduit means having a given length and diameter and said fluid torque-restraint system being filled with a predetermined volume of incompressible fluid and said fluid operating at an equilibrium temperature;
    f) whereby said volume of said fluid contained within said fluid torque-restraint system being selected according to the equation:

$$Vf = \{(T/\Delta t)(1/(2R\ Ap\ Kv\ Ct))\}$$

where
    Vf is the fluid volume needed,
    T is the applied torque,
    $\Delta t$ is the temperature change experienced by the fluid,
    R is the radius from the center of said engine to said hydraulic mounting,
    Ap is the piston area of said hydraulic mounting,
    Kv is the volume stiffness of said fluid torque-restraint system, and
    Ct is the coefficient of thermal expansion of said fluid,
    whereas said volume of said fluid can be determined to substantially counteract the rotation of said engine relative to said structure under a torque T, the change in said volume of said fluid being caused by a temperature change $\Delta t$ experienced by said fluid as said engine reaches said equilibrium temperature.

2. A fluid torque-restraint system as set forth in claim 1 wherein the coefficient of thermal expansion of said fluid is changed to substantially counteract rotations of said engine relative to said structure as said temperature of said volume of said fluid changes.

3. A fluid torque-restraint system as set forth in claim 1 wherein the system further comprises a reservoir means, said reservoir means being connected to at least one of the group of components including said conduit means, said first hydraulic mounting, and said second hydraulic mounting, for supplying additional volume of said fluid.

4. A fluid torque-restraint system as set forth in claim 1 wherein said conduit means includes fill means.

5. A fluid torque-restraint system for restraining the torque between an aircraft engine and a structure, which is used with at least one other resilient mount, wherein said fluid torque-restraint comprises:
    a) a first hydraulic mounting;
    b) a substantially similar second hydraulic mounting;
    c) said first hydraulic mounting and said second hydraulic mounting each including
        i) an inner member for connecting to said structure,
        ii) an outer member for connecting to said engine, and
        iii) a rubber section resiliently connecting said inner member and said outer member;
    d) said outer member, said inner member and said rubber section cooperating to form a fluid chamber within each said hydraulic mounting;
    e) said fluid chambers within said first hydraulic mounting and said second hydraulic mounting being interconnected by a conduit means having a given length and diameter and said fluid torque-restraint system being filled with a predetermined volume of incompressible fluid and said fluid operating at an equilibrium temperature;
    f) whereby said volume of said fluid contained within said fluid torque-restraint system being selected according to the equation:

$$Vf = \{(T/\Delta t)(1/(2R\ Ap\ Kv\ Ct))\}$$

where
    Vf is the fluid volume needed,
    T is the applied torque,
    $\Delta t$ is the temperature change experienced by the fluid,
    R is the radius from the center of said engine to said hydraulic mounting,
    Ap is the piston area of said hydraulic mounting,
    Kv is the volume stiffness of said fluid torque-restraint, and
    Ct is the coefficient of thermal expansion of said fluid,
    whereas said volume of said fluid can be determined to substantially counteract the rotation of said engine relative to said structure under a torque T, the change in said volume of said fluid being caused by a temperature change $\Delta t$ experienced by said fluid as said engine reaches said equilibrium temperature.

6. A fluid torque-restraint system as set forth in claim 5 wherein the coefficient of thermal expansion of said fluid is changed to substantially counteract rotations of said engine relative to said structure as said temperature of said volume of said fluid changes.

* * * * *